US012658049B2

(12) United States Patent
Senninger et al.

(10) Patent No.: US 12,658,049 B2
(45) Date of Patent: Jun. 16, 2026

(54) ALERT SYSTEM FOR WARNING VULNERABLE ROAD USERS IN A GIVEN ROAD SECTION

(71) Applicant: Continental Automotive Technologies GmbH, Hannover (DE)

(72) Inventors: Dominik Senninger, Burglengenfeld (DE); Miroslaw Robakowski, Neutraubling (DE)

(73) Assignee: Continental Automotive Technologies GmbH, Hannover (DE)

( * ) Notice: Subject to any disclaimer, the term of this patent is extended or adjusted under 35 U.S.C. 154(b) by 141 days.

(21) Appl. No.: 18/481,722

(22) Filed: Oct. 5, 2023

(65) Prior Publication Data

US 2024/0119841 A1 Apr. 11, 2024

(30) Foreign Application Priority Data

Oct. 5, 2022 (DE) ..................... 10 2022 210 507.9

(51) Int. Cl.
*G08G 1/16* (2006.01)
*G08G 1/01* (2006.01)
*G08G 1/052* (2006.01)

(52) U.S. Cl.
CPC ........... *G08G 1/166* (2013.01); *G08G 1/0129* (2013.01); *G08G 1/052* (2013.01)

(58) Field of Classification Search
CPC ....... G08G 1/166; G08G 1/0129; G08G 1/052
See application file for complete search history.

(56) References Cited

U.S. PATENT DOCUMENTS 9,659,496 B2 5/2017 Massey
9,908,470 B1 * 3/2018 Englander .............. B60K 35/00
(Continued)

FOREIGN PATENT DOCUMENTS

DE 102013212359 A1 12/2014
DE 102016212700 A1 1/2018
(Continued)

OTHER PUBLICATIONS

German Office Action dated May 9, 2023 for the German Patent Application No. 10 2022 210 507.9 and DeepL translation of same.
(Continued)

*Primary Examiner* — Hussein Elchanti
(74) *Attorney, Agent, or Firm* — Fitch, Even, Tabin & Flannery LLP

(57) ABSTRACT

An alert system for warning road users in a road section. A receiver unit receives movement data of detected road users (DRUs) in relation to the road section. A memory unit has prediction modules with decreasing prediction qualities. A first prediction module makes at least one DRU position prediction if first conditions are satisfied. The second prediction module makes at least one DRU position prediction if the first conditions are not satisfied and second conditions are satisfied. The third prediction module makes at least one DRU position prediction if the first and second conditions are not satisfied. A test module tests whether the first, second, or third conditions are satisfied in relation to the road section and the DRU and selects the prediction module with the highest prediction quality with a satisfied condition. A processor predicts at least a future position of the DRUs using the selected prediction module.

16 Claims, 3 Drawing Sheets

(56) References Cited

U.S. PATENT DOCUMENTS

| | | | | |
|---|---|---|---|---|
| 2011/0260848 | A1* | 10/2011 | Rodriguez Barros | B60Q 1/324 340/438 |
| 2015/0094943 | A1* | 4/2015 | Yoshihama | G08G 1/16 701/301 |
| 2018/0151077 | A1* | 5/2018 | Lee | G08G 1/161 |
| 2019/0035276 | A1* | 1/2019 | Zruya | G08G 1/162 |
| 2020/0286384 | A1* | 9/2020 | Borsos | G08G 1/164 |
| 2021/0001860 | A1* | 1/2021 | Kawasaki | B60W 30/09 |
| 2021/0078600 | A1* | 3/2021 | Price | G08G 1/143 |
| 2021/0287546 | A1* | 9/2021 | Englander | G08G 1/166 |
| 2021/0300360 | A1* | 9/2021 | Sasin | B60Q 1/525 |
| 2022/0058947 | A1* | 2/2022 | Nakagawa | G08G 1/166 |
| 2022/0135021 | A1 | 5/2022 | Furuta | |

FOREIGN PATENT DOCUMENTS

| | | | |
|---|---|---|---|
| DE | 102019215141 | A1 | 4/2021 |
| EP | 3690396 | A1 | 8/2020 |

OTHER PUBLICATIONS

European Search Report dated Mar. 7, 2024 for the counterpart European Patent Application No. 23196777.9 and translation of same.

Mahir Gulzar et al., “A Survey on Motion Prediction of Pedestrians and Vehicles for Autonomous Driving”, IEEE Access ( vol. 9), pp. 137957-137969, Date of Publication: Oct. 5, 2021, DOI: 10.1109/ACCESS.2021.3118224. Cited in NPL Cite No. 1.

* cited by examiner

ALERT SYSTEM FOR WARNING VULNERABLE ROAD USERS IN A GIVEN ROAD SECTION

CROSS-REFERENCE TO RELATED APPLICATIONS

The present application claims the benefit and/or priority of German Patent Application No. 10 2022 210 507.9 filed on Oct. 5, 2022, the content of which is incorporated by reference herein.

TECHNICAL FIELD

The invention relates to an alert system for warning vulnerable road users in a given road section, including a receiver unit with a communications interface for receiving a multiplicity of movement data of detected road users in relation to the road section.

BACKGROUND

The avoidance of collisions is a basic requirement for all drivers of vehicles, such as automobiles, trucks, motorbikes, driving to a desired destination. The prior art has disclosed the practice of drawing the attention of a vehicle user to the presence of vehicles in the vicinity by virtue of the other vehicles being detected by sensors, such as onboard vehicle radar systems, for example. However, such systems are restricted to recognizing other vehicles within the range of the sensor, typically within a few vehicle lengths.

However, there also are already approaches in relation to the specification of a general system for road sections, to increase the safety in a road network.

Thus, U.S. Pat. No. 9,659,496 B2 discloses a method and a system for increasing the safety in a road network, comprising: an interaction detector having a communications interface for receiving a multiplicity of monitoring vectors of a first vehicle and a second vehicle moving in the road network, an interaction risk module designed to determine whether there is an interaction between the first vehicle and the second vehicle on the basis of the multiplicity of monitoring vectors, with the interaction being determined without use of prior knowledge about a preplanned route of each of the first vehicle and the second vehicle in the road network, and a message generator designed to generate a message for at least the second vehicle in response to the interaction risk module determining an interaction, and to transmit the message to the second vehicle via the communications interface.

SUMMARY

It is therefore an object of the present disclosure to specify an improved, general, vehicle-independent alert system for warning vulnerable road users in a given road section.

This object is addressed by an alert system for warning vulnerable road users in a given road section, including a receiver unit with a communications interface for receiving a multiplicity of movement data of detected road users in relation to the road section, and wherein a memory unit is provided, the latter having at least three or more prediction modules with decreasing prediction qualities, with the first prediction module being designed to make at least one prediction of the position of the detected road users if specific first conditions are satisfied, the second prediction module being designed to make at least one prediction of the position of the detected road users if the first conditions are not satisfied and only specific second conditions are satisfied, and the third prediction module being designed to make at least one prediction of the position of the detected road users if the first conditions and the second conditions are not satisfied, and wherein a test module is provided, the latter being designed to test whether the first conditions or the second conditions or the third conditions are satisfied in relation to the road section and the road user and, in sequence of decreasing quality and depending on satisfied conditions, to select the prediction module with the highest prediction quality, and wherein a processor is provided, the latter being designed to predict at least the future position of the detected road users on the basis of the selected prediction module.

Road sections can be the current road sections (locations), or a road section can be used as a representative for others, for example sufficiently similar roundabouts/crossings, etc.

In this case, road sections may include individual sections of the road network or a plurality of roads.

In particular, the first conditions include the second conditions.

In this context, the alert system can be arranged on an infrastructure element, for instance traffic lights, in the road section or for example be embodied in a cloud or edge cloud, etc.

By way of example, the movement data may include sensor data recorded by the vehicles themselves, for example from a surround lying ahead, or else by camera systems recording the road section overall. By way of example, these camera systems can be arranged in traffic lights. The road users and the movement data (trajectories) associated therewith can be extracted from these sensor data by means of conventional extraction methods. In this context, these sensor data are transmitted and evaluated in real time. For example, a previous short movement trajectory of the road users can be created as movement data from the extracted sensor data.

According to the present disclosure, it was recognized that the state-of-the-art evaluation as to whether a situation is potentially hazardous only being carried out using very simple methods represents a significant problem. Thus, only the current position of the road users is used or a simple extrapolation of current movement vectors/movement trajectories is performed. However, this leads to the problem that warnings in the case of hazardous situations are only output once the road users have already come (too) close together. However, this very late warning means that the road users can no longer react or can only react with great difficulties, whereby the situations may become even more acute (emergency brake, incorrect evasive maneuvers).

As an additional problem, a simple and exclusive extrapolation of the movement vectors further allows only a very inaccurate prediction. This leads to a vast amount of unnecessarily triggered warnings, possibly prompting a user/vehicle user to deactivate such a warning system or unnecessarily distracting the vehicle user from the traffic on the road too often, which can itself cause hazardous situations.

These problems are now addressed by the alert system according to the present disclosure.

The future position of the road users can be recognized very reliably by way of the alert system according to the present disclosure. As a result, a potentially hazardous situation can subsequently be recognized more reliably.

Thus, at least three prediction modules with different decreasing prediction quality are provided, and these supply a reliable prediction on the basis of the conditions currently applicable to the road section and road users.

In this context, it was recognized that the different prediction modules with the different prediction qualities each require different assumptions/conditions. In this context, "decreasing" means that the first prediction module has a higher prediction quality than the second prediction module, and the second prediction module has a higher prediction quality than the third prediction module.

As a result of the alert system according to the present disclosure, the prediction module with the highest prediction quality is always resorted to—the first prediction module with the first conditions in this case—and, should this not be possible since the first conditions are not satisfied, the prediction module with fewer conditions is resorted to—the second prediction module with the second conditions in this case—and a third prediction module is only resorted to if neither of the first and second conditions is satisfied. Depending on the conditions prevailing in this road section, this always yields a prediction with the highest prediction quality for this road section. As a result, the position of the road users can be predicted more accurately and with greater probability than in the prior art, whereby even future hazardous situations can be determined better and with a higher probability.

In a further embodiment, the prediction quality at least includes the probability of occurrence and/or the accuracy of a future position of a road user. If no probability of occurrence can be determined, it can be roughly approximated. Further, other prediction qualities, such as resolution and prediction time period, may also be encompassed. In particular, the prediction modules are designed to predict the positions of the road users as reliably as possible in a time period of up to 5 seconds. If the future positions of the road users are now known with associated probabilities and accuracies, for example with a resolution of 200 ms and prediction horizon of 5 s, then potential future hazardous situations can be determined more accurately and more reliably therefrom.

In a further embodiment, the movement data at least include the current and previous position, speed and direction of a road user over a short period of time, especially over a just elapsed period of time up to a current time. In this case, sensor data can easily and reliably be detected in real time by means of sensors arranged on the vehicle, drones or cameras/sensors in the corresponding traffic management systems, for example traffic lights, and the movement data can be recognized from these sensor data as an extracted trajectory of the road users.

In a further configuration, the movement data include data from further data sources that serve for routing traffic in the relevant road section. Consequently, the alert system can use further data sources provided these are available. Thus, for example, the prediction or accuracy of the movement data can be further improved by using data such as current and future traffic light switching.

In a further configuration, the first prediction module includes a trained artificial neural network for the road section or a sufficiently similar road section and an HD (high definition) map for the relevant road section as first condition, wherein the first prediction module is designed to make the prediction on the basis of the trained artificial neural network for a first road user for the road section using the movement data of the road user and the HD map. A very exact prediction can be made as a result. In this case, an HD map is a high resolution, high definition map which includes a current image representation of reality, including guardrails, trees, ditches and other traffic-relevant objects such as footways and crosswalks.

The movement data are input into the trained artificial neural network using the current locations of the road users in the HD map, and this supplies a very accurate prediction in relation to the road users. In this case, the artificial neural network trained in respect of such a prediction has been trained by means of historical data in particular, with the result that an accurate prediction is made possible.

In a further embodiment, the artificial neural network is only trained for special cases in relation to specific road users and their future positions. By way of example, these special cases can be a prediction as to whether a vehicle will turn off or drive straight ahead. The application to special cases is advantageous in that less historical data is required for the training since the amount of available data represents a limitation, especially for the application of machine learning methods.

In a further embodiment, the second prediction module includes an HD map for the road section as its second condition, wherein the second prediction module is designed to make the prediction in relation to a road user for the road section on the basis of the HD map for the road section, using the movement data of the road user.

If no artificial neural network is available for the road section or a similar road section, a prediction with the aid of an available HD map can be performed by means of the second prediction module. In this case, possible future positions (future trajectories), for example in lanes/on footways, are determined and provided with probabilities on the basis of the movement data, which is to say the current and previous positions and the movement directions. To this end, a continued movement of the road user is assumed in order to obtain the future positions and future movement directions.

In this case, in a further embodiment, a highly precise HD map at least includes the roads and the footways and the traffic routing elements such as crosswalks. In this case, highly precise HD maps image a road network very accurately, for example with centimeter accuracy.

In a further configuration, the third prediction module is designed to make the prediction in relation to a road user for the road section on the basis of an extrapolation using the movement data of the road user. This corresponds to a simple extrapolation of the movement vectors/trajectories. In particular, this can even be used if, for example, a road user is not situated on a usually used path, for example if a pedestrian crosses the road at a forbidden point.

Further, the processor may be embodied to compare the prediction in relation to each road user in pairwise fashion in order to determine potentially hazardous situations in corresponding time steps. For example, if the future positions of the road users are known with a prediction horizon of 5 s and with associated probabilities and accuracies, potentially future hazardous situations can be calculated therefrom. To this end, the predictions in relation to the road users can be compared in pairwise fashion for each time step in the future.

In a further embodiment, the processor is designed to determine the hazardousness of a situation by means of at least one of the following factors: the size of an overlap region between two road users and/or on the basis of a future acceleration of a road user and/or on the basis of a future angle between two road users and/or the time until a potential collision between two road users and/or on the basis of the lanes used by the road users.

Thus, a greater overlap region between two road users indicates a greater danger. The future speed of one of the road users increasing also corresponds to a greater danger, especially in the case of a significant acceleration. Additionally, the future angle between the road users can be considered; thus, an approach directly from behind usually means a lower danger since the assumption can be made that the road user approaching from behind notices the vehicle up ahead. By contrast, a greater danger can be assumed in the case of an approach from the side (angle not equal to zero) or an expected change in the movement direction. The time until an expected collation may likewise be considered; thus, in the case of a relatively reliable prediction, less time until the collision also means less time to react and hence a greater danger.

Likewise, the lanes used by two road users can be considered; thus a low danger tends to be assumed when the same lane is used since the own lane is usually always in view, and a greater danger is assumed in the case of crossing lanes, especially if a cycle path and road cross.

In particular, a combination of the factors can be drawn upon in order to reliably identify a hazardous situation.

In a further configuration, the processor is designed to take account of the type of road user as a further factor when determining the hazardousness of a situation. Thus, the danger can be virtually precluded for two pedestrians, even in the case of a very large overlap, for example at traffic lights; however, a high danger should be assumed if a vehicle/truck is involved.

Furthermore, in a further configuration, the processor is designed to assess recognized hazardous situations by means of an assessment value. The latter can easily be determined on the basis of the recognized aforementioned factors, such as the size of the overlap region, etc.; i.e., an assessment as to how hazardous the future situations are is now determined from these factors.

In a further embodiment, the processor is designed to transmit an alert to at least the road users involved in the hazardous situation once a given threshold value in relation to the assessment value has been exceeded. An alert is transmitted to the road users involved should a certain threshold value be exceeded. In particular, this alert includes at least a message and the assessment value. Thus, the transmitted alerts which have a low assessment can additionally be filtered out on the terminal of the road users, for example. This allows the vehicle user themselves to influence the number of alerts displayed. Thus, a vehicle user willing to take risks can prevent the display of what are subjectively too many alerts.

BRIEF DESCRIPTION OF THE DRAWINGS

Further advantages and properties of the present disclosure are clear from the following description, in which exemplary embodiments of the present disclosure are explained in detail on the basis of the drawing. In the figures, in each case schematically.

DETAILED DESCRIPTION

Figure 1:
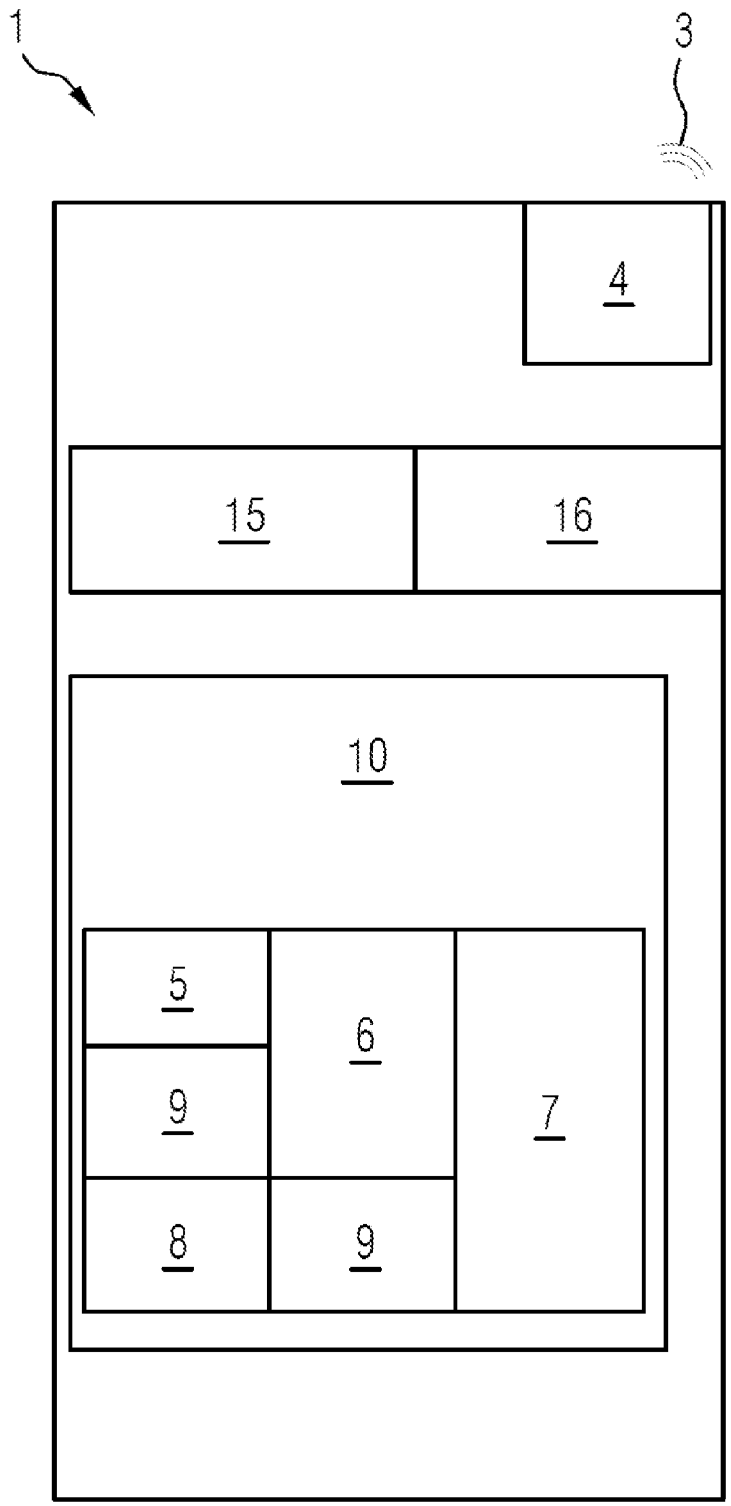
FIG. 1: schematically shows the alert system.
Figure 2:
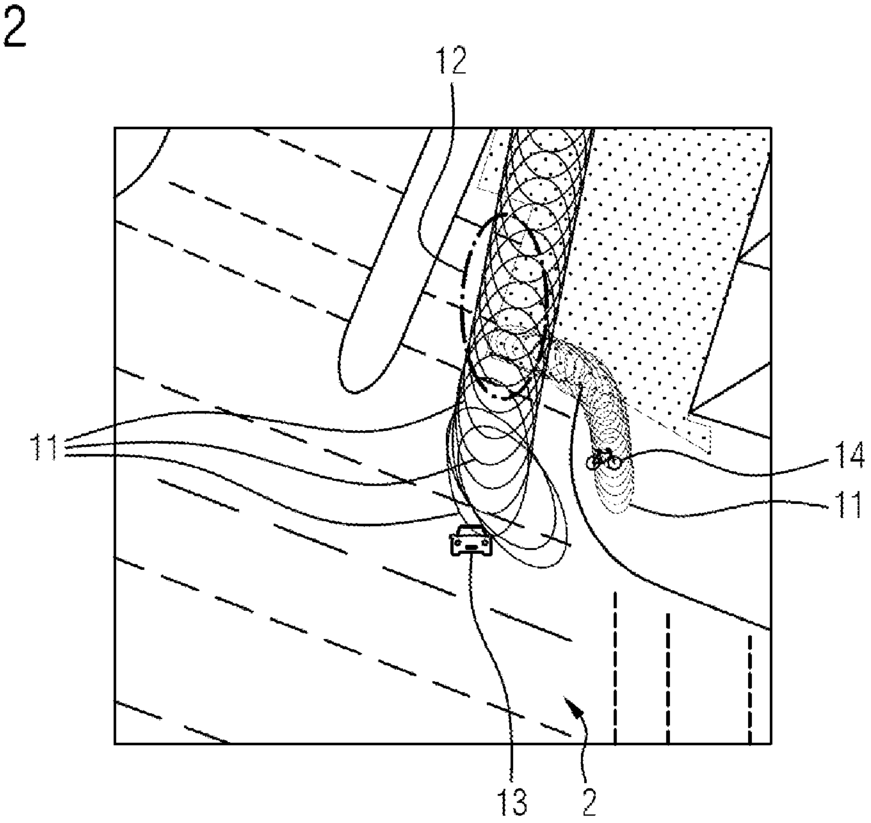
FIG. 2: shows a prediction using the first prediction module.

FIG. 1 schematically shows the alert system 1 for warning vulnerable road users in a given road section 2 (FIG. 2). By way of example, the alert system 1 can be integrated in an infrastructure element such as traffic lights at the road edge, or in a cloud or edge cloud.

In this case, the alert system 1 includes a receiver unit 4 with a communications interface 3 for receiving a multiplicity of movement data of detected road users in relation to the road section 2. These movement data may be in the form of sensor data or may be extracted from the latter, said sensor data originating from lidar/radar and camera systems arranged on the vehicles or for example from sensor systems arranged in the surrounding infrastructure elements such as traffic lights. The road users and their movement data, in particular movement trajectories, can be extracted from these sensor data. In this case, the extraction and transmission is implemented in real time. In this case, the movement data at least include the current and previous position, speed and direction of a road user over a short period of time with a respective time stamp.

Moreover, the alert system 1 can use further data sources provided these are available. For example, the movement data can be further improved by using data of the current and future traffic light switching, and consequently it is also possible to improve the prediction at a later stage.

Further, the alert system 1 includes a memory unit 10. Stored in the latter are at least three prediction models 5, 6, 7, with the first prediction module 5 having the highest prediction quality and the third prediction module 7 having the lowest prediction quality.

In this case, the three prediction modules 5, 6, 7 can be in the form of software modules.

Further, even more prediction modules may likewise be stored.

In this case, each of the prediction modules 5, 6, 7 is designed to make a prediction of the position of the detected road users if certain conditions which are coupled to the prediction module 5, 6, 7 are satisfied. Now, a plurality of prediction modules 5, 6, 7 which have different prediction qualities but also require different assumptions (conditions) are available for the prediction.

In this case, the prediction quality can be determined on the basis of a resolution and a prediction horizon with associated probabilities and an accuracy in relation to at least the future position of a road user. For example, a high prediction quality includes a high resolution, for example a resolution of 200 ms, and a prediction horizon of 5 s with associated probabilities and corresponding accuracies.

In this case, the first prediction module 5 is designed to make at least one prediction of the position of the detected road users if certain first conditions are satisfied.

In this case, the first prediction module 5 requires as a first condition a trained artificial neural network 8 for the road section 2 or for a sufficiently similar road section, and an HD map 9 for the relevant road section 2. This means that an artificial neural network 8 must have previously been trained in advance for this road section 2, and an HD map 9 must be present. In this case, an HD map 9 is a high resolution, high definition map which images at least the roads and the footways and traffic routing elements such as crossways in highly precise fashion and with centimeter accuracy.

In this case, the artificial neural network 8 may have been trained using historical data.

It is also possible to use the first prediction module 5 only for special cases, for example for the prediction as to whether a vehicle will turn off or drive straight ahead. The application to special cases is advantageous in that less historical data is required for the training, whereby time and costs are saved.

In this case, the second prediction module 6 is designed to make at least one prediction of the position of the detected road users if the first conditions are not satisfied and only certain second conditions are satisfied. In this case, the second conditions correspond to a presence of an HD map 9 for the corresponding road section 2. In this case, possible lanes are calculated and provided with probabilities on the basis of the current and previous positions and movement directions. Then, a continued movement of the road user in the found lanes is assumed in order to obtain the future positions and movement directions.

Further, the third prediction module 7 is designed to make the prediction in relation to a road user for the road section 2 on the basis of an extrapolation using the movement data of the road user. This can also be brought about without HD map 9 and without artificial neural network 7. This corresponds to a simple extrapolation of the movement vectors/trajectories. In particular, this can even be used if, for example, a road user is not situated on a usually used path, for example if a pedestrian crosses the road at a forbidden point.

Further, a test module 15 is present, the latter being designed to test whether the first or the second or the third conditions are met in relation to the road section 2 and the road users, and to select, in a sequence of decreasing quality and depending on conditions met, the corresponding prediction module 5, 6, 7 in a sequence of decreasing quality.

Consequently, the test module 15 always attempts to initially use the first prediction module 5, as this has the highest prediction quality, and to only subsequently resort to the second prediction module 6 with the second conditions, in this case the HD map 9, if the first conditions such as artificial neural network 8 are not satisfied. The third prediction module 7 is resorted to if no HD map 9 is available for the road section 2 either.

As a result, the prediction module 5, 6, 7 with the highest prediction quality is always used, and the next lower prediction module 6, 7 is only resorted to should this not be possible because the conditions for the prediction module with the highest prediction quality are not satisfied.

In this case, different prediction modules 5, 6, 7 may be used for different road users within one traffic situation.

Subsequently, a prediction of at least the future position of the detected road users is generated by means of a processor 16 on the basis of the selected prediction module 5, 6, 7 for the road users.

If the future positions of the road users are now known due to the prediction modules 5, 6, 7, for example with a resolution of 200 ms and prediction horizon of 5 s with associated probabilities and accuracies, then potentially future hazardous situations 12 can be determined therefrom by the processor 16. To this end, the predictions in relation to the road users are compared in pairwise fashion for each time step in the future by the processor 16.

In this case, the processor 16 can use the following factors on an individual basis, but preferably in combination, for the purpose of determining a hazardous situation 12 between the road users:

- The size of the overlap of a calculated dwell region of the road users. Thus, a greater overlap region between two road users indicates a greater danger;
- The position of the overlap relative to the estimated position. Thus, an overlap closer to the center of the estimated position means a greater danger;
- The future speed of the road users; thus, a higher speed, in particular a significant acceleration, means a greater danger;
- A present or future angle between the road users; thus, an approach directly from behind usually means a low danger since the assumption can be made that the road user approaching from behind has noticed the vehicle up ahead. By contrast, a greater danger can be assumed in the case of an approach from the side or an expected change in the movement direction;
- A consideration of the lanes used by two road users; thus a low danger tends to be assumed when the same lane is used since the own lane is usually always in view, and a greater danger is assumed in the case of crossing lanes, especially if a cycle path and road cross;
- A time until an expected collision; thus, in the case of a relatively reliable prediction, less time until the collision means less time to react and hence greater danger;
- The same or different type of road user; thus, the danger can be virtually precluded for two pedestrians, even in the case of a very large overlap, for example at traffic lights; however, a high danger should be assumed if a vehicle/truck is involved.

Furthermore, in a further configuration, the processor 16 is designed to assess a recognized hazardous situation 12 by means of an assessment value. The latter can easily be determined on the basis of the recognized aforementioned factors, such as the size of the overlap region, etc.; i.e., an assessment as to how hazardous the future situation 12 is now calculated from these factors.

The processor 16 transmits a message and also the assessment value as an alert to the road users involved should a certain threshold value be exceeded.

Thus, these alerts can be filtered in respect of the assessment value on the terminal of the road users. For example, all alerts that have an assessment value that is too low for the individual road user can be filtered out. This allows the road user themselves to influence the number of warnings displayed. Thus, a road user willing to take risks can avoid the display of what are subjectively too many alerts.

FIG. 2 shows a prediction using the first prediction module 5.

In this scenario, a car 13 coming from the east turns off toward the north and in the process crosses the lane of a cyclist 14 likewise coming from the east. The bicycle symbol 14 and car symbol 13 represent the current positions of the road users involved.

The blue ellipses 11 represent the predicted dwell regions of the bicycle 14 and of the car 13.

In this example, historical data were used to train an artificial neural network 8 to determine whether a vehicle drives straight ahead or turns off at this crossing, using the speed of approach. The current movement data are now input into the neural network 8 trained thus, and the latter generates predictions in relation to the car 13 and the cyclist 14 using the HD map 9 for this crossing.

As a result of the first prediction module 5 with the trained artificial neural network 8, which resorts to an HD map 9, it is now possible to identify, in a timely manner, that the car 13 will turn off, and that hence a hazardous situation 12 will arise.

As a result of using the first prediction module 5, it is possible to obtain a high prediction quality and, accordingly, a reliable prediction for the future positions of the road users. Consequently, hazardous situations 12 can be recognized accurately and reliably, and also in good time.

Figure 3:
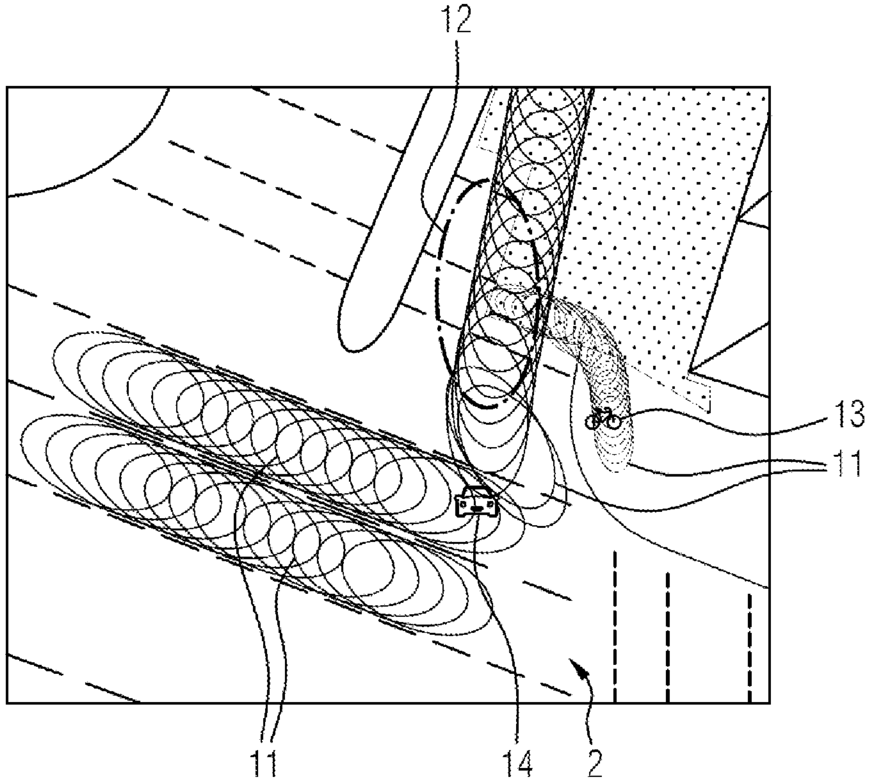
FIG. 3: shows a prediction using the second prediction module.

FIG. 3 shows a prediction of the aforementioned scenario using the second prediction module 6. In this scenario, the car 13 coming from the east turns off toward the north and in the process crosses the lane of the cyclist 14 likewise coming from the east. The bicycle symbol 14 and car symbol 13 once again represent the current positions of the road users involved. The blue ellipses 11 once again represent the predicted dwell regions of the bicycle 14 and of the car 13.

In this example, the prediction is made by the second prediction module 6 by means of the HD map 9. In this case, it is already possible to make a prediction here that the car 13 could turn to the right, and that a hazardous situation 12 could arise as a result. However, there is uncertainty as to whether this will actually happen in this way because it is also possible that the car 13 will continue its journey in a straight line. As a result of using the second prediction module 6, it is possible to obtain a medium prediction quality and, accordingly, an intermediately reliable prediction for the future positions of the road users. Hazardous situations can thus be recognized.

Figure 4:
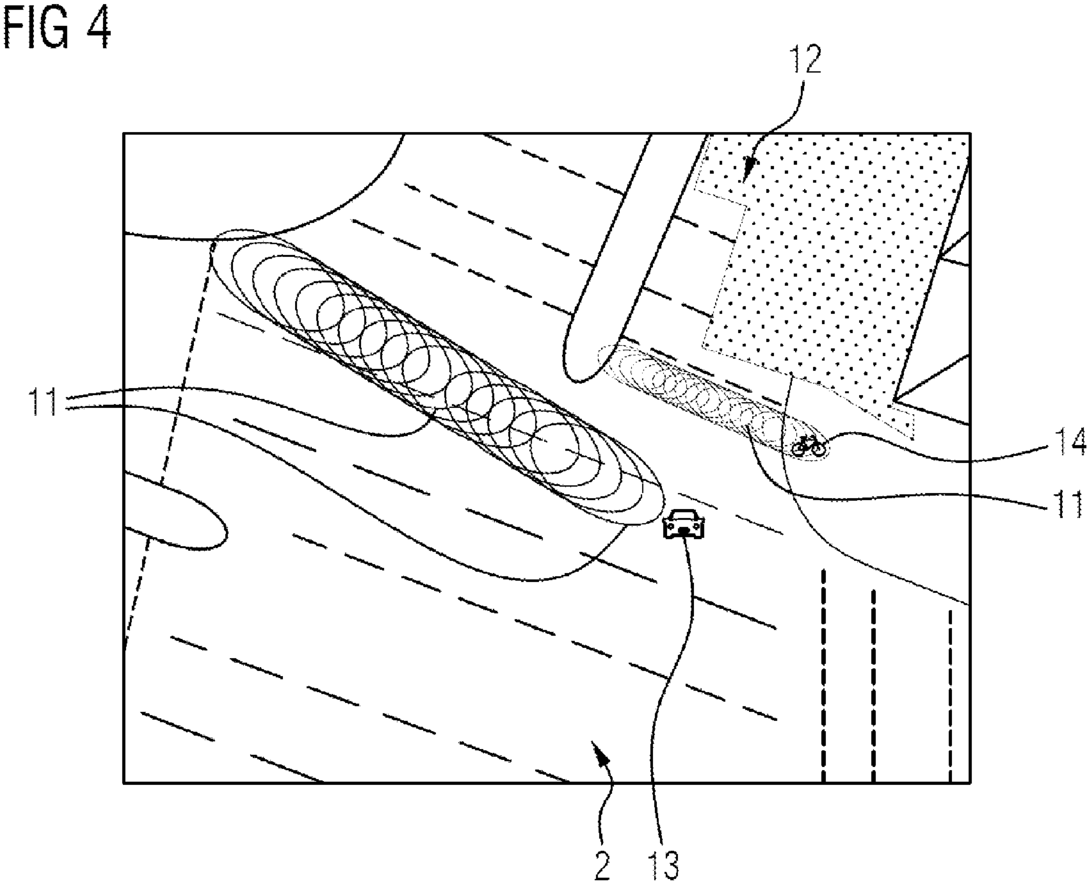
FIG. 4: shows a prediction using the third prediction module.

FIG. 4 shows a prediction of the aforementioned scenario using the third prediction module 7. In this same scenario, the car 13 coming from the east again turns off toward the north and in the process crosses the lane of a cyclist 14 likewise coming from the east. The bicycle symbol 14 and car symbol 13 represent the current positions of the road users involved. The blue ellipses 11 once again represent the predicted dwell regions of the bicycle 14 and of the car 13.

In this example, the prediction is made by the third prediction module 7 by extrapolating the past and current movement vectors/movement data. In so doing, the third prediction module 7 does not recognized that the car 13 will soon drive to the right. Accordingly, no alert is output.

By way of the alert system 1 according to the present disclosure with the at least three prediction modules with decreasing prediction quality, it is possible to better recognize a potentially hazardous situation 12 by virtue of always using the best possible prediction module 5, 6, 7 for determining the future positions of the road users.

LIST OF REFERENCE SIGNS

1 Alert system
2 Road section
3 Communications interface
4 Receiver unit
5 First prediction module
6 Second prediction module
7 Third prediction module
8 Artificial neural network
9 HD map
10 Memory unit
11 Blue ellipses
12 Hazardous situation
13 Car
14 Bicycle
15 Test module
16 Processor

The invention claimed is:

1. An alert system for warning vulnerable road users in a given road section, comprising:

a processor;

a receiver unit with a communications interface for receiving a multiplicity of movement data of detected road users in relation to the road section, a memory unit having at least three prediction modules stored therein including a first prediction module, a second prediction module, and a third prediction module, the prediction modules with decreasing prediction qualities, the first prediction module being configured to make at least one prediction of a position of the detected road users if specific first conditions are satisfied, the second prediction module being configured to make at least one prediction of the position of the detected road users if the first conditions are not satisfied and only specific second conditions are satisfied, and the third prediction module being configured to make at least one prediction of the position of the detected road users if the first conditions and the second conditions are not satisfied, and a test module being configured to test whether the first conditions, the second conditions or the third conditions are satisfied in relation to the road section and the road users and, in sequence of decreasing quality and depending on satisfied conditions, to select the prediction module with a highest prediction quality, wherein the first prediction module, second prediction module, third prediction module, and test module are separate and structurally distinct from each other, comprise executable software, and only one of the prediction modules is executed by the processor based upon the selection made by the test module;

wherein the processor is configured to predict at least one future position of the detected road users on the basis of the selected prediction module;

wherein the processor is configured to transmit an alert to at least the detected road users involved in the hazardous situation once a first threshold value in relation to the assessment value has been exceeded, wherein the alert is rendered on at least one terminal of the detected road users, and the at least one terminal has an adjustable filter that is effective to filter out incoming alerts when a second selectable threshold value has not been exceeded.

2. The alert system as claimed in claim 1, wherein the prediction quality at least comprises at least one of a probability of occurrence or an accuracy of a future position.

3. The alert system as claimed in claim 1, wherein the movement data at least comprise a current and a previous position, speed and direction of a detected road user of the detected road users over a short period of time.

4. The alert system as claimed in claim 3, wherein the movement data comprise data from further data sources that serve for routing traffic in the relevant road section.

5. The alert system as claimed in claim 1, wherein the first prediction module comprises a trained artificial neural network for the road section or a similar road section and a high definition (HD) map for the road section as first conditions, and wherein the first prediction module is configured to make the prediction on the basis of the trained artificial neural network for a road user of the detected road users for the road section using the movement data of the road user and the HD map.

6. The alert system as claimed in claim 5, wherein the artificial neural network is trained using historical data.

7. The alert system as claimed in claim 5, wherein the artificial neural network is only trained for special cases in relation to specific road users of the detected road users and future positions of the specific road users.

8. The alert system as claimed in claim 1, wherein the second prediction module comprises an HD map for the road section as the second condition, wherein the second prediction module is configured to make the prediction in relation to a detected road user of the detected road users for the road section on the basis of the HD map for the road section, using the movement data of the detected road user.

9. The alert system as claimed in claim 5, wherein the HD map at least comprises roads, footways and traffic routing elements.

10. The alert system as claimed in claim 1, wherein the third prediction module is configured to make the prediction in relation to a detected road user of the detected road users for the road section on the basis of an extrapolation using the movement data of the detected road user.

11. The alert system as claimed in claim 1, wherein the processor is further configured to compare the prediction in relation to each detected road user in pairwise fashion in order to determine potentially hazardous situations in corresponding time steps.

12. The alert system as claimed in claim 1, wherein the processor is configured to determine a hazardousness of a situation by at least one of the following factors: a size of an overlap region between two detected road users, on the basis of a future acceleration of a detected road user, on the basis of a future angle between two detected road users, a time until a potential collision between two road users, or on the basis of lanes used by the detected road users.

13. The alert system as claimed in claim 12, wherein the processor is configured to take account of a type of detected road user as a further factor when determining the hazardousness of the situation.

14. The alert system as claimed in claim 1, wherein the processor is configured to assess recognized hazardous situations by an assessment value.

15. The alert system as claimed in claim 14, wherein the processor is configured to transmit an alert to at least the detected road users involved in the hazardous situation once a given threshold value in relation to the assessment value has been exceeded.

16. The alert system as claimed in claim 15, wherein the alert comprises at least a notification and the assessment value.

* * * * *